US008249101B2

(12) United States Patent
Crain, Jr. et al.

(10) Patent No.: US 8,249,101 B2
(45) Date of Patent: Aug. 21, 2012

(54) MOBILE AD HOC NETWORK CONFIGURED AS A VIRTUAL INTERNET PROTOCOL NETWORK

(75) Inventors: Gary W. Crain, Jr., Palm Harbor, FL (US); Michael L. Mullins, Riverview, FL (US); Theodore B. Wesson, Largo, FL (US)

(73) Assignee: Raytheon Company, Waltham, MA (US)

( * ) Notice: Subject to any disclaimer, the term of this patent is extended or adjusted under 35 U.S.C. 154(b) by 229 days.

(21) Appl. No.: 12/732,382

(22) Filed: Mar. 26, 2010

(65) Prior Publication Data

US 2011/0235573 A1    Sep. 29, 2011

(51) Int. Cl.
*H04J 3/16* (2006.01)
*H04J 3/22* (2006.01)
*H04W 4/00* (2009.01)
*H04L 12/28* (2006.01)
*H04L 12/56* (2006.01)

(52) U.S. Cl. .................... 370/466; 370/328; 370/392

(58) Field of Classification Search .................. 370/328, 370/389, 392, 466
See application file for complete search history.

(56) References Cited

U.S. PATENT DOCUMENTS

| | | | | |
|---|---|---|---|---|
| 7,948,966 | B2 * | 5/2011 | Hughes et al. | 370/351 |
| 2008/0259927 | A1 * | 10/2008 | Evans et al. | 370/394 |
| 2009/0046622 | A1 * | 2/2009 | Hua | 370/315 |

OTHER PUBLICATIONS

Tschudin, et al.; *Active, Programmable, and Mobile Code Networking; Active Routing for Ad Hoc Networks*; XP011091274; pp. 122-127, Apr. 1, 2000.
Chelius, et al.; *Ananas: A Local Area Ad Hoc Network Architectural Scheme*; XP010611833; pp. 130-134, Sep. 9, 2002.
Fang, et al.; *Comparison Studies of OSPF-MDR, OLSR and Composite Routing*; The 2010 Military Communications Conference—Unclassified Program—Networking Protocols and Performance Track; XP031843275; pp. 989-994, Oct. 31, 2010.
*PCT Notification of Transmittal of the International Search Report and the Written Opinion of the International Searching Authority* for Application No. PCT/US2011/028044; 11 pages, Jun. 9, 2011.
Wikipedia, "Optimized Link State Routing Protocol," http://en.wikipedia.org/wiki/Optimized_Link_State_Routing_Protocol, 5 pages, Mar. 5, 2010.
OLSR Routing Protocol (RFC3626), "OLSR Optimized Link State Routing," http://hipercom.inria.fr/olsr/, 6 pages, Printed Mar. 24, 2010.
Wikipedia "Topology Dissemination Based on Reverse-Path Forwarding," http://en.wikipedia.org/wiki/Topology_Dissemination_Based_on_Reverse-Path_Forwarding, 1 page, Oct. 16, 2009.

(Continued)

*Primary Examiner* — Ronald Abelson
(74) *Attorney, Agent, or Firm* — Cantor Colburn LLP (57) ABSTRACT

According to one embodiment, a method for facilitating communication of a MANET is provided. A MANET may include a plurality of nodes configured as a virtual IP network. The virtual IP network may comprise a plurality of physical paths of the MANET. The physical paths may couple an IP network to an IP node. Each physical path may traverse a distinct set of nodes of the MANET. The physical paths may be represented to the IP network as a logical path comprising one or more virtual IP nodes.

24 Claims, 4 Drawing Sheets

OTHER PUBLICATIONS

Ogier et al., "Topology Dissemination Based on Forwarding (TBRPF)", Network Working Group, http://www.rfc-editor.org/rfc/rfc3684.txt, 43 pages, Feb. 2004.

Wikipedia, "Ad hoc On-Demand Distance Vector Routing," http://en.wikipedia.org/wiki/Ad_hoc_On-Demand_Distance_Vector_Routing, 3 pages, Mar. 24, 2010.

"A Quick Guide to AODV Routing," http://w3.antd.nist.gov/wctg/aodv_kernel/A%20Quick%20Guide%20to%20AODV%20Routing.pdf, 7 pages, Printed Mar. 24, 2010.

Wikipedia, "Dynamic Source Routing," http://en.wikipedia.org/wiki/Dynamic_Source_Routing, 3 pages, Feb. 3, 2010.

Wiki, "Dynamic Source Routing," http://wiki.uni.lu/secan-lab/Dynamic+Source+Routing.html, 3 pages, Mar. 18, 2005.

* cited by examiner

MOBILE AD HOC NETWORK CONFIGURED AS A VIRTUAL INTERNET PROTOCOL NETWORK

GOVERNMENT FUNDING

The U.S. Government may have certain rights in this invention as provided for by the terms of Contract No. N00024-03-C-5118 TI-26 awarded by the United States Navy.

TECHNICAL FIELD

This invention relates generally to networks and more specifically to mobile ad hoc networks.

BACKGROUND

A mobile ad hoc network (MANET) may comprise a plurality of mobile nodes coupled together. Frequent topology changes within the MANET may complicate data routing.

SUMMARY OF THE DISCLOSURE

In accordance with the present invention, disadvantages and problems associated with previous techniques for interfacing a mobile ad hoc network (MANET) with one or more internet protocol (IP) nodes may be reduced or eliminated.

According to one embodiment, a method for facilitating communication of a MANET is provided. A MANET may include a plurality of nodes configured as a virtual IP network. The virtual IP network may comprise a plurality of physical paths of the MANET. The physical paths may couple an IP network to an IP node. Each physical path may traverse a distinct set of nodes of the MANET. The physical paths may be represented to the IP network as a logical path comprising one or more virtual IP nodes.

Certain embodiments of the invention may provide one or more technical advantages. A technical advantage of one embodiment may be that physical paths may be represented to an IP network as a logical path. Representing physical paths as a logical path may allow for changes in the physical paths without affecting the logical path. Another technical advantage of one embodiment may be that nodes of an IP network may use a terrestrial IP routing protocol to route data across a MANET.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1-5 of the drawings, like numerals being used for like and corresponding parts of the various drawings.

Figure 1:
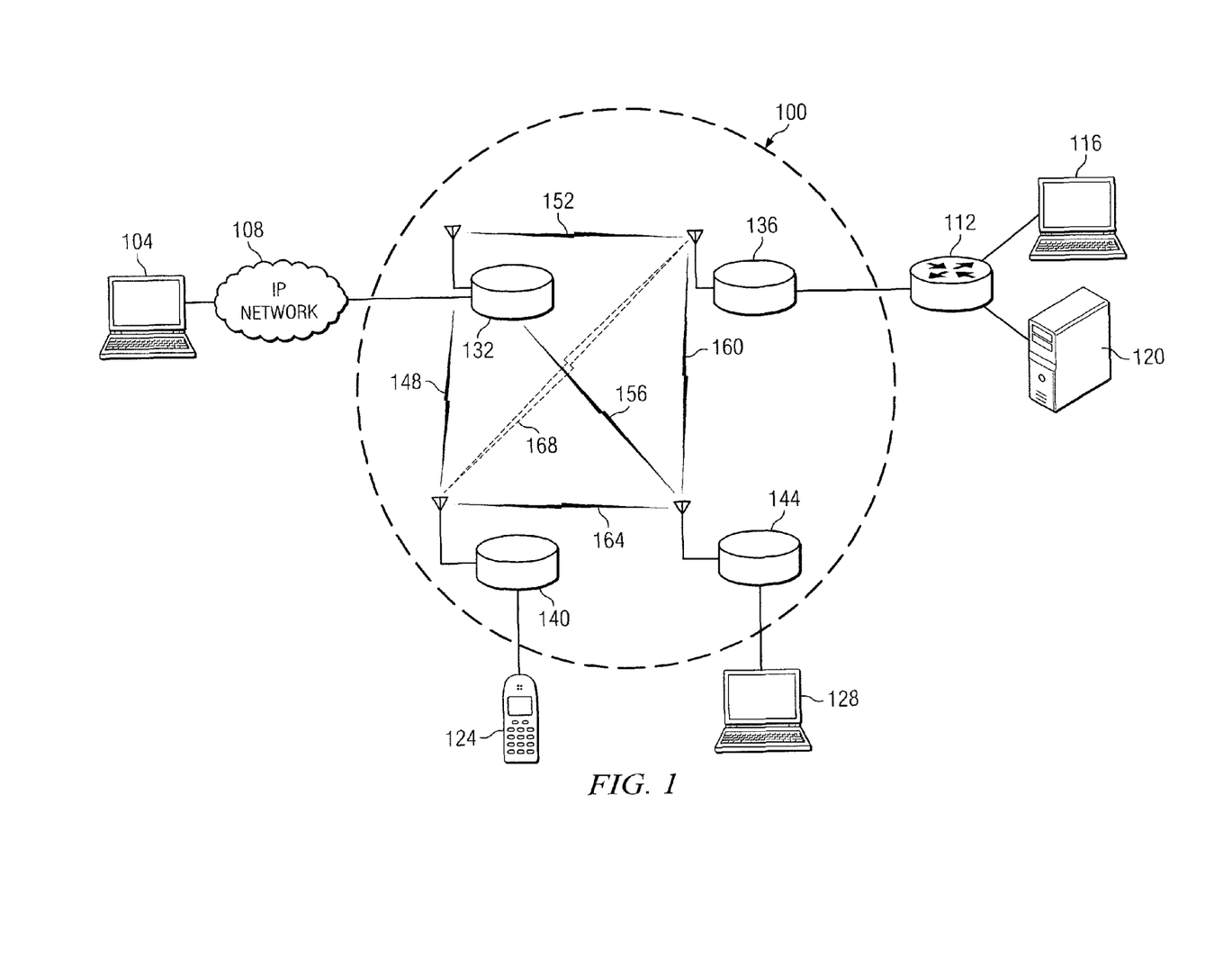
FIG. 1 depicts an exemplary system comprising a mobile ad hoc network (MANET) and a plurality of internet protocol (IP) nodes.

FIG. 1 depicts a MANET 100. A mobile ad hoc network (MANET) is a type of wireless ad hoc network that comprises mobile devices. At least some of the devices are operable to route traffic to other devices of the MANET. In some embodiments, a MANET may comprise a set of nodes, such as mobile devices. In general, each node of the MANET may be coupled to one or more other nodes of the MANET by wireless links (such as radio signals or other suitable wireless connections), wired links, or a combination of these. In the illustrated example, MANET 100 comprises MANET nodes 132-144 coupled together by wireless links 148-164. At least some of the MANET nodes may be operable to route data to other nodes of the MANET.

In some embodiments, one or more MANET nodes 144 may also be coupled to one or more Internet Protocol (IP) nodes 128. For example, MANET nodes 132, 136, 140, and 144 are respectively coupled to IP nodes 108, 112, 124, and 128. In general, an IP node 144 has an IP address and may be capable of sending and receiving IP packets according to a terrestrial IP routing protocol, such as Open Shortest Path First (OSPF) or Intermediate System to Intermediate System (IS-IS). In general, an IP node 128 may be an IP host or an IP network comprising a group of IP hosts networked together. In some embodiments, a MANET node 144 may be coupled to an IP node 128 by a wired connection such as an Ethernet cable or other suitable wired connection, a wireless connection, or a combination of the preceding. In some embodiments, a mobile device may comprise both a MANET node 144 and an IP node 128. For example, a mobile device may comprise an IP host and a radio operable to function as a MANET node.

In some embodiments, one or more nodes 132-144 of the MANET may be operable to route IP packets between one or more IP networks and/or one or more IP hosts. IP nodes that are coupled to the MANET may be referred to as external IP nodes.

The MANET may comprise a plurality of physical paths that couple external IP nodes together. In an embodiment, a physical path may traverse a set of nodes of the MANET that are coupled together by physical means, such as a wireless or wired link. Each physical path may form a distinct data path. For example, data can travel between external IP nodes 108 and 128 across wireless link 156 along a physical path comprising nodes 132 and 144, across wireless links 148 and 164 along a physical path comprising nodes 132, 140, and 144, or across wireless links 152 and 160 along a physical path comprising nodes 132, 136, and 144. As other examples, a plurality of physical paths may exist between external IP nodes 112 and 124 or between external IP nodes 128 and 124.

In certain embodiments, the network topology of the MANET may undergo changes. In certain embodiments, connections between MANET nodes may be added or dropped. Accordingly, the physical paths from one external IP node to another may change. For example, if wireless link 168 (shown by dotted lines) between MANET nodes 140 and 136 is added to MANET 100, new physical paths are created that may transport data from external IP node 108 to external IP node 128. For example, data could travel across wireless links 148, 168, and 160 along a physical path comprising nodes 132, 140, 136, and 144, or across wireless links 152, 168, and 164 along a physical path comprising nodes 132, 136, 140, and 144. As another example, if wireless link 152 is dropped, the physical path comprising nodes 132, 136, and 144 is dropped.

The frequent adding and dropping of physical paths may complicate the routing of data in the MANET. In general, terrestrial IP routing protocols used in wired networks may not be suitable for routing IP packets in MANETs due to their inefficient handling of network topology changes. Some terrestrial IP routing protocols have been modified in an attempt to improve IP packet routing in MANETs. For example, the IP routing protocols Optimized Link State Routing (OLSR) and Topology Broadcast Based On Reverse Path Forwarding (TBRPF) incorporate concepts of OSPF and modify them to accommodate a MANET environment. However, these modified protocols require the MANET to communicate changes in MANET topology via maintenance traffic to the external IP nodes. This may be problematic in a MANET because of limited bandwidth and the possibility of routing protocol thrashing, that is, the generating of excessive protocol messages due to inefficient handling of an event by an algorithm. In severe cases, protocol thrashing may prevent an algorithm from settling.

Some embodiments of the present invention significantly reduce maintenance traffic by configuring the MANET as a virtual IP network. In an embodiment, the virtual IP network may comprise a plurality of physical paths between two external IP nodes that are represented to the external IP nodes as a logical path with one or more virtual IP nodes. A virtual IP node may comprise one or more MANET nodes represented as an IP node comprising an IP address and capable of receiving and sending IP packets according to a terrestrial IP routing protocol. Thus, from an external IP node's perspective, the MANET is one or more IP nodes coupling the external IP node to one or more other external IP nodes. Accordingly, external IP nodes may send IP packets across the MANET to other external IP nodes as if the MANET comprised one or more IP nodes. The virtual IP network may comprise a plurality of such logical paths, where each logical path is representative of a plurality of physical paths between a distinct external IP node pair.

In some embodiments, certain topology changes, such as added or dropped physical paths of the MANET, do not change the representative logical paths. Accordingly, these topology changes do not need to be communicated to external IP nodes via maintenance traffic. In some embodiments, an external IP node is notified of an addition or deletion of a physical path only when an external IP node becomes unreachable via any physical path or a new external IP node becomes reachable via a node of the MANET. Thus, maintenance traffic is significantly reduced, the need for a modified IP routing protocol to accommodate a MANET is negated, and an external IP node can send IP packets across a MANET according to a terrestrial IP routing protocol. Embodiments of a MANET configured as a virtual IP network are described below.

Figure 2:
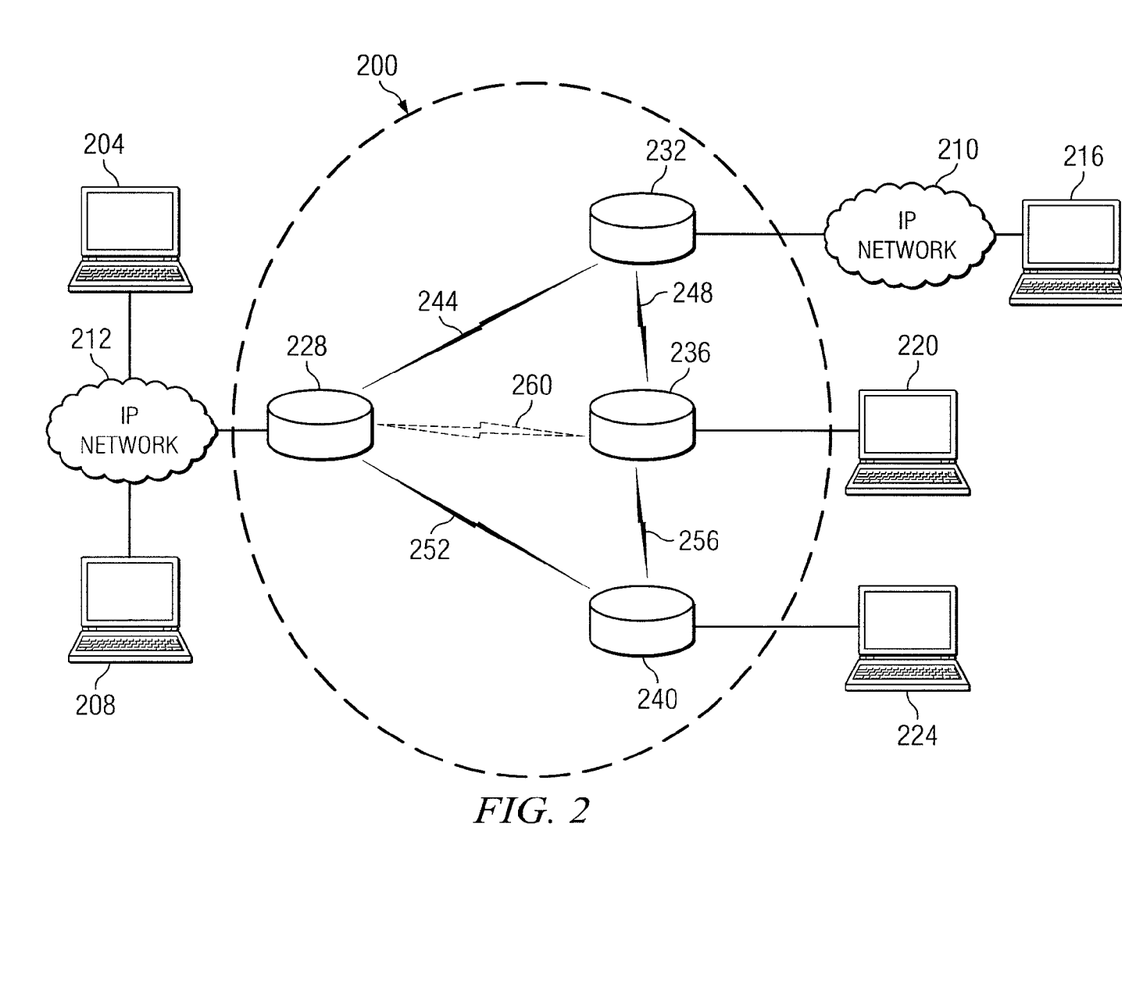
FIG. 2 depicts an exemplary MANET coupled to a plurality of IP nodes.
Figure 3:
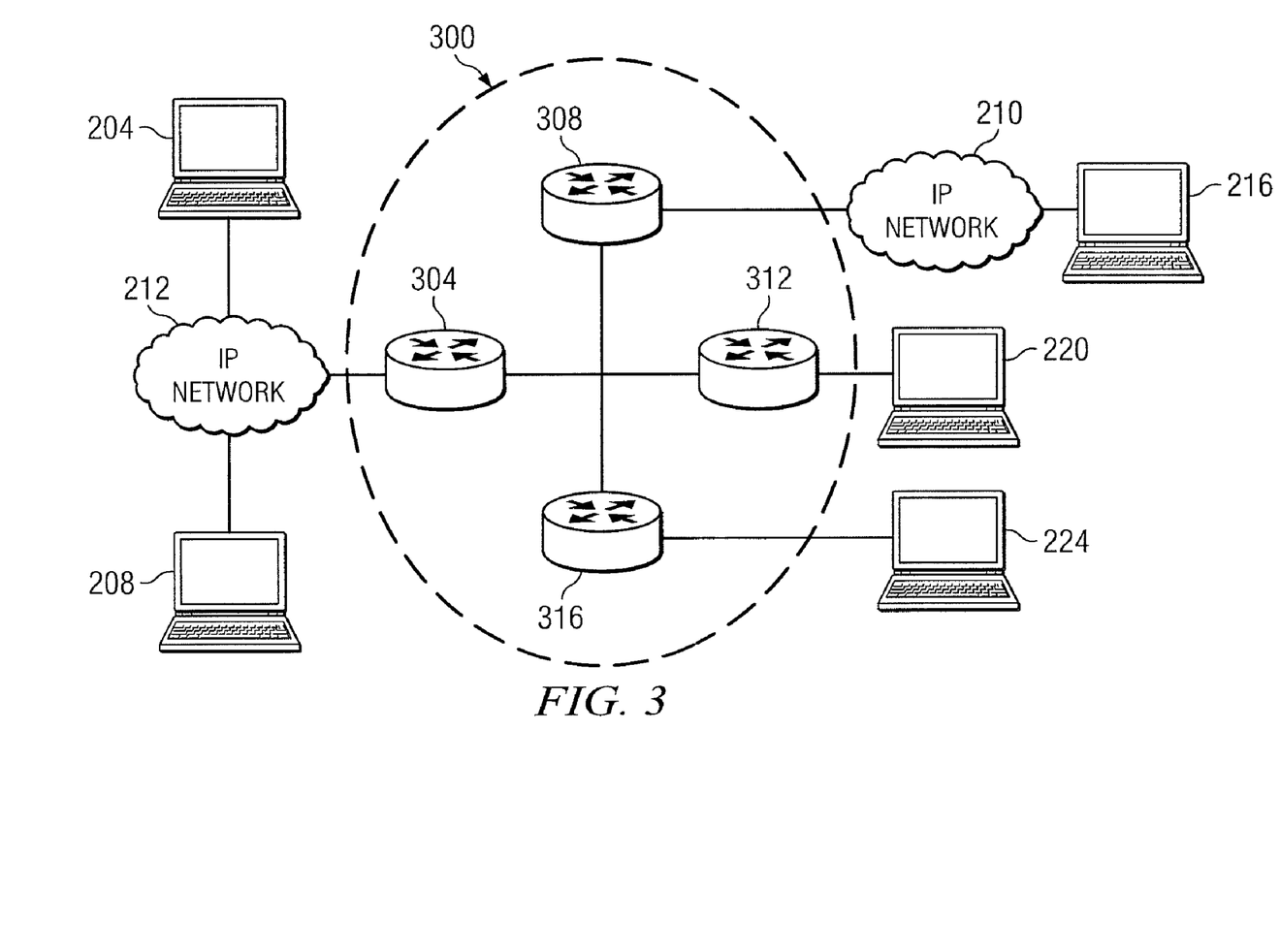
FIG. 3 depicts the MANET of FIG. 2 configured as an exemplary virtual IP network.
Figure 4:
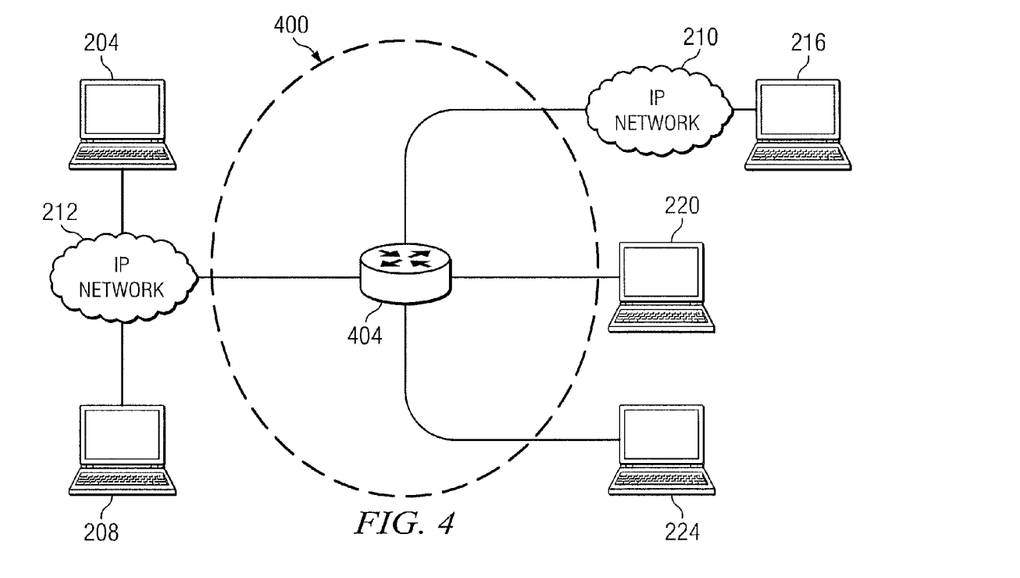
FIG. 4 depicts the MANET of FIG. 2 configured as another exemplary virtual IP network.
Figure 5:
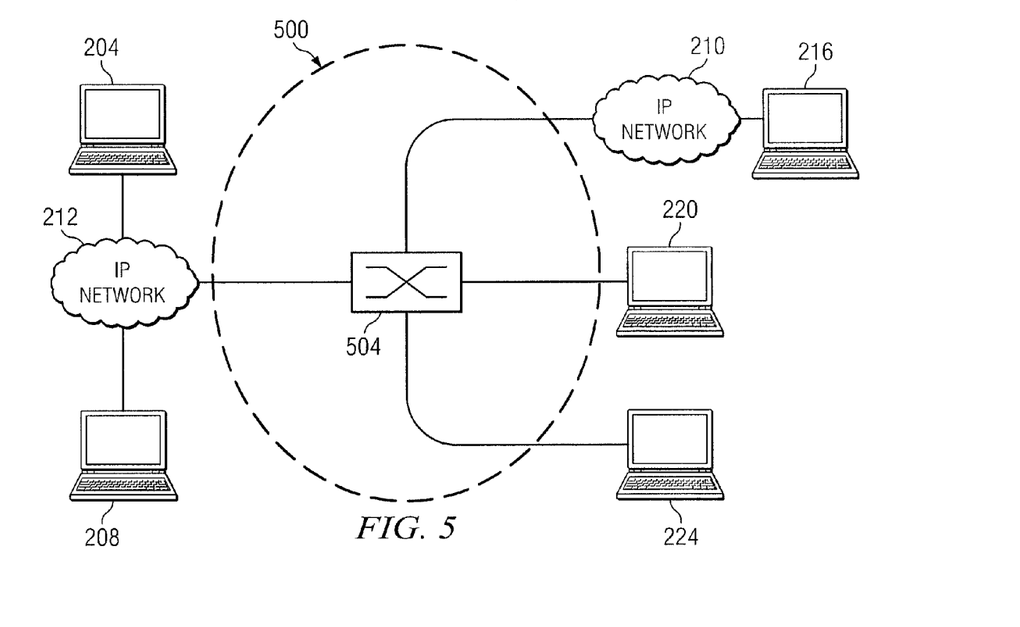
FIG. 5 depicts the MANET of FIG. 2 configured as another exemplary virtual IP network.

FIG. 2 depicts a MANET 200 coupled to external IP nodes 204-224. MANET 200 comprises a plurality of physical paths coupling external IP network 212 (and external IP hosts 204-208) to external IP network 210 (and external IP host 216) and external IP hosts 220 and 224. FIGS. 3-5 depict various embodiments of MANET 200 configured as a virtual IP network.

FIG. 3 depicts virtual IP network 300 comprising virtual IP nodes 304-316. Virtual IP network 300 is a representation of MANET 200 to the external IP nodes. Even though a plurality of physical paths may exist between two external IP nodes, each external IP node sees the physical paths as one logical path comprising one or more virtual IP nodes. For example, there are a plurality of physical paths from IP network 212 to IP host 220. IP network 212, however, sees these physical paths as one logical path comprising virtual IP nodes 304 and 312.

In an embodiment, as long as IP network 212 and IP host 220 are reachable through at least one node of the MANET, the logical path does not change. For example, virtual IP network 300 and its logical paths do not change if wireless link 256 is dropped or wireless link 260 (shown by dotted lines) is added in the MANET 200. After such changes, the IP network may continue sending IP packets to IP host 220 across the MANET according to the same logical path.

In some embodiments, one or more nodes of the MANET may select a physical path for transmission of IP packets between external IP nodes independently of the external IP nodes. That is, one or more nodes may select the physical path even when the external IP nodes are ignorant of the physical paths of the MANET that connect them to other external IP nodes. For example, an external IP node may only have knowledge of other external IP nodes and their IP addresses and/or the IP addresses of one or more virtual IP nodes, but not of the locations of MANET nodes. In some embodiments, one or more nodes of the MANET may choose a new physical path for IP packet transmission between two external IP nodes in response to an added or dropped physical path between the nodes. This selection may also be done independently of the external IP nodes.

In some embodiments, the nodes of the MANET may use a custom routing protocol to route IP packets within the MANET. For example, the custom routing protocol may be designed to facilitate communication between MANET nodes that operate according to a particular radio. This approach avoids suboptimal routing that may occur when using a generalized routing protocol designed for all radio networks. In some embodiments, a custom routing protocol may route data according to bandwidth utilization of connections between MANET nodes. For example, the nodes of the MANET may select a new physical path for transmission of data if the bandwidth across the currently used physical path exceeds a certain value.

In an embodiment, the virtual IP nodes of the logical path may comprise virtual IP routers that appear to external IP nodes as IP routers having an IP address and operable to route IP packets between external IP nodes and/or other virtual IP routers according to a terrestrial IP protocol. A virtual IP router may examine a header of a received IP packet and look up the next hop in a routing table. In an embodiment, a logical path between external IP nodes may comprise two virtual IP routers. For example, from the perspective of IP network 212, the virtual IP network 300 may comprise primary virtual IP router 304 and secondary virtual IP routers 308-316. To external nodes, the primary virtual IP router 304 and secondary virtual IP routers appear to be directly connected regardless of the number of MANET nodes in the physical path between the respective external IP nodes.

In some embodiments, a MANET node (for example, MANET node 228) that is connected to IP network 212 may be represented as primary virtual IP router 304, and the MANET nodes (for example, MANET nodes 232-240) that are connected to other external IP nodes may be represented as secondary virtual IP routers 308-316. In some embodiments, one more MANET nodes may perform the functions of an IP router. In some embodiments, IP network 212 may send IP packets to any of IP network 210 or hosts 220-224 by addressing the IP packets as if the connection between IP network 212 and the receiving external IP node comprised two IP routers, that is, two routers having distinct IP addresses and capable of routing IP packets according to a terrestrial IP routing protocol. In an embodiment, IP host 224 would see the MANET portion of the path to IP host 208 as two IP routers, primary virtual IP router 316 and secondary virtual IP router 304.

In an embodiment, one or more MANET nodes may be configured with a virtual Ethernet driver operable to receive IP packets from an IP node and encapsulate the packets into a radio signal for transmission to other MANET nodes. For example, a software module that emulates an Ethernet driver may be added to a memory of a MANET node. In some embodiments, a MANET node may have a wireless or wired connection to an external IP node. The MANET node may receive an IP packet from an external IP node and store it in an IP stack. The IP stack may reside in memory of the MANET node. The virtual Ethernet driver may receive the IP packet from the IP stack and encapsulate the IP packet in a radio signal. The virtual Ethernet driver may include a header in the radio signal. For example, the header may specify at least a portion of the physical path across which the radio signal should travel. The radio signal is then transmitted to another node of the MANET.

In an embodiment, a virtual Ethernet driver of a MANET node may be operable to receive a radio signal that encapsulates one or more IP packets, extract the IP packets from the radio signal, and transmit the IP packets to an external IP node. For example, the MANET node may receive a radio signal from another MANET node and extract one or more IP packets from the radio signal. The extracted packets may be sent to an IP stack of the MANET node and stored until they are transmitted over a connection to an external IP node.

FIG. 4 depicts MANET 200 configured as virtual IP network 400. Virtual IP network 400 comprises virtual IP router 404 disposed between the IP network 212 and the IP network 210 and IP hosts 220-224. The virtual IP router may have an IP address and be operable to route IP packets between external IP nodes according to a terrestrial IP routing protocol. In certain embodiments, an external IP node may address IP packets to other external IP nodes as if the nodes were connected via an IP router. Accordingly, the MANET nodes may collectively function as an IP router coupling an external IP network to one or more external IP hosts. In an embodiment, one or more MANET nodes are operable to perform the functions of an IP router that routes IP packets according to a terrestrial IP routing protocol.

FIG. 5 depicts MANET 200 configured as virtual IP network 500. Virtual IP network 500 comprises virtual IP switch 504 disposed between the IP network 212 and IP network 210 and IP hosts 216-224. In certain embodiments, an external IP node may address IP packets to other external IP nodes as if the nodes were connected via an IP switch, that is, a switch directly connecting the IP nodes and operable to forward IP packets. Accordingly, the MANET nodes may collectively perform the functions of an IP switch connected to a plurality of IP nodes.

In some embodiments, a MANET node connected to an external IP node may listen to the IP traffic of the external IP node. For example, an Ethernet driver of the MANET node may be configured to promiscuous mode such that all IP packets of the external IP node may be collected. When the MANET node detects an IP packet destined for a second external IP node, it forwards this packet through the MANET to the second external IP node. In an embodiment, the MANET node forwards an IP packet when the packet comprises a Media Access Control (MAC) address of an external IP node coupled to the MANET.

Modifications, additions, or omissions may be made to the systems and apparatuses disclosed herein without departing from the scope of the invention. The components of the systems and apparatuses may be integrated or separated. For example, an external IP host may reside on the same device as a MANET node. Moreover, the operations of the systems and apparatuses may be performed by more, fewer, or other components. For example, the operations of virtual IP nodes 304-316, 404, and 504 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The method may include more, fewer, or other steps. Additionally, steps may be performed in any suitable order.

A component of the systems and apparatuses, such as MANET nodes and/or IP nodes, disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising: facilitating, by at least a subset of a plurality of nodes, communication of a mobile ad hoc network (MANET), the nodes configured as a virtual Internet Protocol (IP) network, the virtual IP network comprising a plurality of physical paths of the MANET, each physical path coupling an IP network to an IP node, each physical path traversing a distinct set of nodes of the MANET; and representing, to the IP network, the physical paths of the virtual IP network as a logical path comprising one or more virtual IP nodes, adding a physical path to the physical paths of the virtual IP network; determining with a node of the distinct set of nodes of the MANET whether responsive to the addition of the physical path, a previously unreachable IP node has become reachable, and sending a notification from the node of the distinct set of nodes of the MANET to at least one IP node that indicates that the previously unreachable IP node has become reachable.

2. The method of claim 1, further comprising: selecting a physical path of the physical paths for transmission of an IP packet from the IP network to the IP node, the selecting accomplished by at least one node of the MANET independently of the IP network.

3. The method of claim 1, further comprising: adding a physical path to the physical paths of the virtual IP network; and after adding the physical path, continuing to represent the physical paths as the logical path.

4. The method of claim 1, further comprising: configuring a first node of the MANET with a virtual Ethernet driver, the virtual Ethernet driver operative to: receive a first IP packet from the IP network; and encapsulate the first IP packet into a radio signal for transmission to a second node of the MANET.

5. The method of claim 1, further comprising: configuring a first node of the MANET with a virtual Ethernet driver, the virtual Ethernet driver operative to: receive a radio signal encapsulating an IP packet from a second node of the MANET; extract the IP packet from the radio signal; and transmit the IP packet to the IP network.

6. The method of claim 1, the representing, to the IP network, the physical paths of the virtual IP network as a logical path comprising one or more virtual IP nodes further comprising: representing, to the IP network, the virtual IP network as a primary router and a plurality of secondary routers, the primary router represented as coupling the IP network to a plurality of secondary routers, each secondary router represented as coupling an IP node of a plurality of IP nodes to the primary router.

7. The method of claim 1, the representing, to the IP network, the physical paths of the virtual IP network as a logical path comprising one or more virtual IP nodes further comprising: representing, to the IP network, the virtual IP network as a router comprising an IP address, the router disposed between the IP network and the IP node.

8. The method of claim 1, the representing, to the IP network, the physical paths of the virtual IP network as a logical path comprising one or more virtual IP nodes further comprising: representing, to the IP network, the virtual IP network as an IP switch disposed between the IP network and the IP node.

9. An apparatus comprising: an interface configured to: communicate with at least a subset of a plurality of nodes of a mobile ad hoc network (MANET) configured as a virtual Internet Protocol (IP) network, the virtual IP network comprising a plurality of physical paths of the MANET, each physical path coupling an IP network to an IP node, each physical path traversing a distinct set of nodes of the MANET; and a processor configured to: represent, to the IP network, the physical paths of the virtual IP network as a logical path comprising one or more virtual IP nodes, wherein a node of the distinct set of nodes of the MANET is operative to determine, whether a previously reachable IP node has become unreachable, and send a notification from the node of the distinct set of nodes of the MANET to at least one IP node that indicates that the previously reachable IP node has become unreachable.

10. The apparatus of claim 9, the processor further operative to: select at least a portion of a physical path of the physical paths for transmission of an IP packet from the IP network to the IP node, the selecting accomplished independently of the IP network.

11. The apparatus of claim 9, the processor further operative to: add a physical path to the physical paths of the virtual IP network; and after adding the physical path, continue to represent the physical paths as the logical path.

12. The apparatus of claim 9, further comprising: a virtual Ethernet driver operative to: receive a first IP packet from the IP network; and encapsulate the first IP packet into a radio signal for transmission to a node of the MANET.

13. The apparatus of claim 9, further comprising: a virtual Ethernet driver operative to: receive a radio signal encapsulating an IP packet from a node of the MANET; extract the IP packet from the radio signal; and transmit the IP packet to the IP network.

14. The apparatus of claim 9, the representing, to the IP network, the physical paths of the virtual IP network as a logical path comprising one or more virtual IP nodes further comprising: representing, to the IP network, the virtual IP network as a primary router and a plurality of secondary routers, the primary router represented as coupling the IP network to a plurality of secondary routers, each secondary router represented as coupling an IP node of a plurality of IP nodes to the primary router.

15. The apparatus of claim 9, the representing, to the IP network, the physical paths of the virtual IP network as a logical path comprising one or more virtual IP nodes further comprising: representing, to the IP network, the virtual IP network as a router comprising an IP address, the router disposed between the IP network and the IP node.

16. The apparatus of claim 9, the representing, to the IP network, the physical paths of the virtual IP network as a logical path comprising one or more virtual IP nodes further comprising: representing, to the IP network, the virtual IP network as an IP switch disposed between the IP network and the IP node.

17. A tangible computer-readable medium having computer-executable code, when executed by a computer operative to: facilitate communication of at least a subset of a plurality of nodes of a mobile ad hoc network (MANET), the subset of nodes configured as a virtual Internet Protocol (IP) network, the virtual IP network comprising a plurality of physical paths of the MANET, each physical path coupling an IP network to an IP node, each physical path traversing a distinct set of nodes of the MANET; and represent, to the IP network, the physical paths of the virtual IP network as a logical path comprising one or more virtual IP nodes, add a physical path to the physical paths of the virtual IP network; determine with a node of the distinct set of nodes of the MANET, whether responsive to the addition of the physical path, a previously unreachable IP node has become reachable, and send a notification from the node of the distinct set of nodes of the MANET to at least one IP node that indicates that the previously unreachable IP node has become reachable.

18. The medium of claim 17, the medium further operative to: select at least a portion of a physical path of the physical paths for transmission of an IP packet from the IP network to the IP node, the selecting accomplished independently of the IP network.

19. The medium of claim 17, the medium further operative to: add a physical path to the physical paths of the virtual IP network; and after adding the physical path, continue to represent the physical paths as the logical path.

20. The medium of claim 17, the medium further operative to: receive a first IP packet from the IP network; and encapsulate the first IP packet into a radio signal for transmission to a node of the MANET.

21. The medium of claim 17, the medium further operative to: receive a radio signal encapsulating an IP packet from a node of the MANET; extract the IP packet from the radio signal; and transmit the IP packet to the IP network.

22. The medium of claim 17, the representing, to the IP network, the physical paths of the virtual IP network as a logical path comprising one or more virtual IP nodes further comprising: representing, to the IP network, the virtual IP network as a primary router and a plurality of secondary routers, the primary router represented as coupling the IP network to a plurality of secondary routers, each secondary router represented as coupling an IP node of a plurality of IP nodes to the primary router.

23. The medium of claim 17, the representing, to the IP network, the physical paths of the virtual IP network as a logical path comprising one or more virtual IP nodes further comprising: representing, to the IP network, the virtual IP network as a router comprising an IP address, the router disposed between the IP network and the IP node.

24. The medium of claim 17, the representing, to the IP network, the physical paths of the virtual IP network as a logical path comprising one or more virtual IP nodes further comprising: representing, to the IP network, the virtual IP network as an IP switch disposed between the IP network and the IP node.

* * * * *